(12) United States Patent
Lymberopoulos

(10) Patent No.: US 9,103,465 B2
(45) Date of Patent: Aug. 11, 2015

(54) DUAL PISTON ACTUATOR AND METHOD OF USE

(75) Inventor: David Lymberopoulos, Houston, TX (US)

(73) Assignee: SAFOCO, INC., Houston, TX (US)

( * ) Notice: Subject to any disclaimer, the term of this patent is extended or adjusted under 35 U.S.C. 154(b) by 327 days.

(21) Appl. No.: 13/544,618

(22) Filed: Jul. 9, 2012

(65) Prior Publication Data

US 2013/0020519 A1    Jan. 24, 2013

Related U.S. Application Data

(60) Provisional application No. 61/509,024, filed on Jul. 18, 2011.

(51) Int. Cl.
*F16K 31/12* (2006.01)
*F16K 31/122* (2006.01)

(52) U.S. Cl.
CPC ................... *F16K 31/1225* (2013.01)

(58) Field of Classification Search
CPC ........ F16K 1/12; F16K 31/1225; F16K 31/12
USPC .............................. 92/52, 62, 65; 91/169, 173
See application file for complete search history.

(56) References Cited

U.S. PATENT DOCUMENTS

| | | | |
|---|---|---|---|
| 2,933,070 A * | 4/1960 | Trumper et al. | 91/169 |
| 3,269,275 A * | 8/1966 | Waite | 92/52 |
| 3,788,341 A | 1/1974 | Athy, Jr. et al. | |
| 4,008,648 A * | 2/1977 | Farmer et al. | 91/168 |
| 4,213,480 A | 7/1980 | Orum et al. | |
| 4,461,449 A | 7/1984 | Turner | |
| 4,527,429 A | 7/1985 | Combest et al. | |
| 4,568,058 A | 2/1986 | Shelton | |
| 4,585,207 A * | 4/1986 | Shelton | 251/62 |
| 4,667,570 A | 5/1987 | Jensen, Jr. et al. | |
| 4,934,652 A | 6/1990 | Golden | |

(Continued)

FOREIGN PATENT DOCUMENTS

| | | |
|---|---|---|
| EP | 0 647 770 A2 | 4/1995 |
| JP | 07-042856 A | 2/1995 |

(Continued)

OTHER PUBLICATIONS

Versa Series B Valves Bulletin B-2011; Versa Products Company, Inc.; 2011, 8 Pages.

(Continued)

*Primary Examiner* — Nathaniel Wiehe
*Assistant Examiner* — Dustin T Nguyen
(74) *Attorney, Agent, or Firm* — Patterson & Sheridan, L.L.P.

(57) ABSTRACT

A dual piston valve actuator operable to provide an initial thrust force that is greater than a subsequent thrust force for moving a gate valve from a closed position to an open position. The actuator may include a first piston and a second piston movably disposed within a bore of the first piston. The first piston may define a first piston area for proving the initial thrust force, and the second piston may define a second piston area (that is less than the first piston area) for providing the subsequent thrust force. Movement of the first piston is limited relative to the second piston for moving the gate valve using the initial thrust force an initial portion of the valve stroke, while moving the gate valve using the subsequent thrust force the remaining portion of the valve stroke.

18 Claims, 3 Drawing Sheets

(56) References Cited

U.S. PATENT DOCUMENTS

| | | |
|---|---|---|
| 5,097,857 A | 3/1992 | Mayhew |
| 5,132,904 A | 7/1992 | Lamp |
| 5,273,113 A | 12/1993 | Schultz |
| 5,275,086 A | 1/1994 | Stallings, Jr. |
| 5,335,730 A | 8/1994 | Cotham, III |
| 5,490,564 A | 2/1996 | Schultz et al. |
| 5,526,883 A | 6/1996 | Breaux |
| 6,349,772 B2 | 2/2002 | Mullen et al. |
| 6,412,510 B1 | 7/2002 | Johnson |
| 6,435,282 B1 | 8/2002 | Robison et al. |
| 6,450,477 B1 | 9/2002 | Young |
| 6,772,718 B2 | 8/2004 | Allen |
| 6,854,704 B1 | 2/2005 | Young |
| 7,004,445 B2 | 2/2006 | Lymberopoulos |
| RE39,583 E | 4/2007 | Upchurch |
| 7,231,971 B2 | 6/2007 | McCalvin |
| 2002/0112632 A1 | 8/2002 | Faibish |
| 2002/0124889 A1 | 9/2002 | Sundararajan |
| 2005/0087712 A1 | 4/2005 | Lymberopoulos |
| 2005/0236594 A1 | 10/2005 | Lilly et al. |
| 2006/0159569 A1 | 7/2006 | Biester |
| 2011/0036415 A1 | 2/2011 | Lymberopoulos |
| 2011/0240126 A1 | 10/2011 | Lymberopoulos et al. |
| 2012/0233989 A1* | 9/2012 | Fortin et al. ............ 60/325 |

FOREIGN PATENT DOCUMENTS

| | | |
|---|---|---|
| JP | 10-196835 A | 7/1998 |
| JP | 2000-170954 A | 6/2000 |
| WO | 02/25612 A1 | 3/2002 |

OTHER PUBLICATIONS

Rotowink Indicators; Norgren 1996; 2 Pages.
PCT International Search Report and Written Opinion for Application PCT/US2012/046044, dated Nov. 28, 2012.

* cited by examiner

DUAL PISTON ACTUATOR AND METHOD OF USE

CROSS-REFERENCE TO RELATED APPLICATIONS

This application claims benefit of U.S. Provisional Patent Application Ser. No. 61/509,024, filed Jul. 18, 2011, the content of which is herein incorporated by reference in its entirety.

BACKGROUND OF THE INVENTION

1. Field of the Invention

Embodiments of the invention generally relate to a valve actuator. More particularly, embodiments of the invention relate to a dual piston actuator for actuating gate valves.

2. Description of the Related Art

Various designs of valve actuators exist that operate to open and close valves in a variety of uses. The petroleum industry utilizes these actuators to operate gate valves that incorporate a sliding gate within a valve body to selectively block fluid flow through piping or tubing. Positioning gate valves along the piping or tubing at various locations controls and directs the flow of fluids therethrough.

A general operation of a gate valve includes moving a valve stem extending from the valve body to move a gate axially within the valve body between an open position and a closed position. When the gate is in the open position, fluid may flow unobstructed through the valve body. When the gate is in the closed position, the gate blocks fluid flow through the valve body. Typically, an actuator piston is used to impart the axial movement to the valve stem to move the gate to the open position. The actuator also includes a spring to continuously bias the valve stem into the closed position. Thus, force applied to the actuator piston from either a hydraulic or pneumatic source, depending on the type of actuator, must overcome the bias of the spring to move the gate to the open position. In addition to the spring bias, the actuator must be capable of developing sufficient thrust to overcome any static gate sealing, initial drag forces on the gate, and the fluid pressure within the valve body opposing movement of the gate and the valve stem.

Generally, a high thrust force is required only to break any static gate sealing and overcome the initial drag on the gate, but a lesser force is required to continue movement of the gate through the remaining stroke to the open position. The excessive thrust during the remaining stroke may provide undue stress and/or fatigue on the valve stem. Conventional hydraulic or pneumatic actuators include fixed diameter actuator pistons that are adjustable in the application of thrust by the fluid pressure supplied to the actuator. Adjusting the fluid supply to the actuator during operation adds complexity to the gate valve operation. Further, depending on the size of the gate valve and/or the amount of thrust force needed, larger actuators require larger volumes of operating fluid and thus resources to move the actuator piston and the gate valve through the full stroke.

Therefore, there is a need for a new and improved valve actuator operable to provide a high initial thrust force and a subsequent reduced thrust force for operating a valve.

SUMMARY OF THE INVENTION

In one embodiment, an actuator may comprise a housing; a first piston movably disposed in the housing, wherein the first piston comprises an outer shoulder for engagement with an inner shoulder of the housing to limit movement of the first piston in a first direction; and a second piston movably disposed in a bore of the first piston, wherein the second piston is movable in the first direction after engagement between the outer shoulder of the first piston and the inner shoulder of the housing.

In one embodiment, a method of operating an actuator may comprise supplying pressurized fluid to first chamber of an actuator housing, thereby moving a first piston and a second piston in a first direction a pre-determined distance, wherein the second piston is movably disposed within a bore of the first piston; prohibiting movement of the first piston in the first direction beyond the pre-determined distance; and supplying pressurized fluid to a second chamber of the actuator housing, thereby moving the second piston in the first direction beyond the pre-determined distance.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
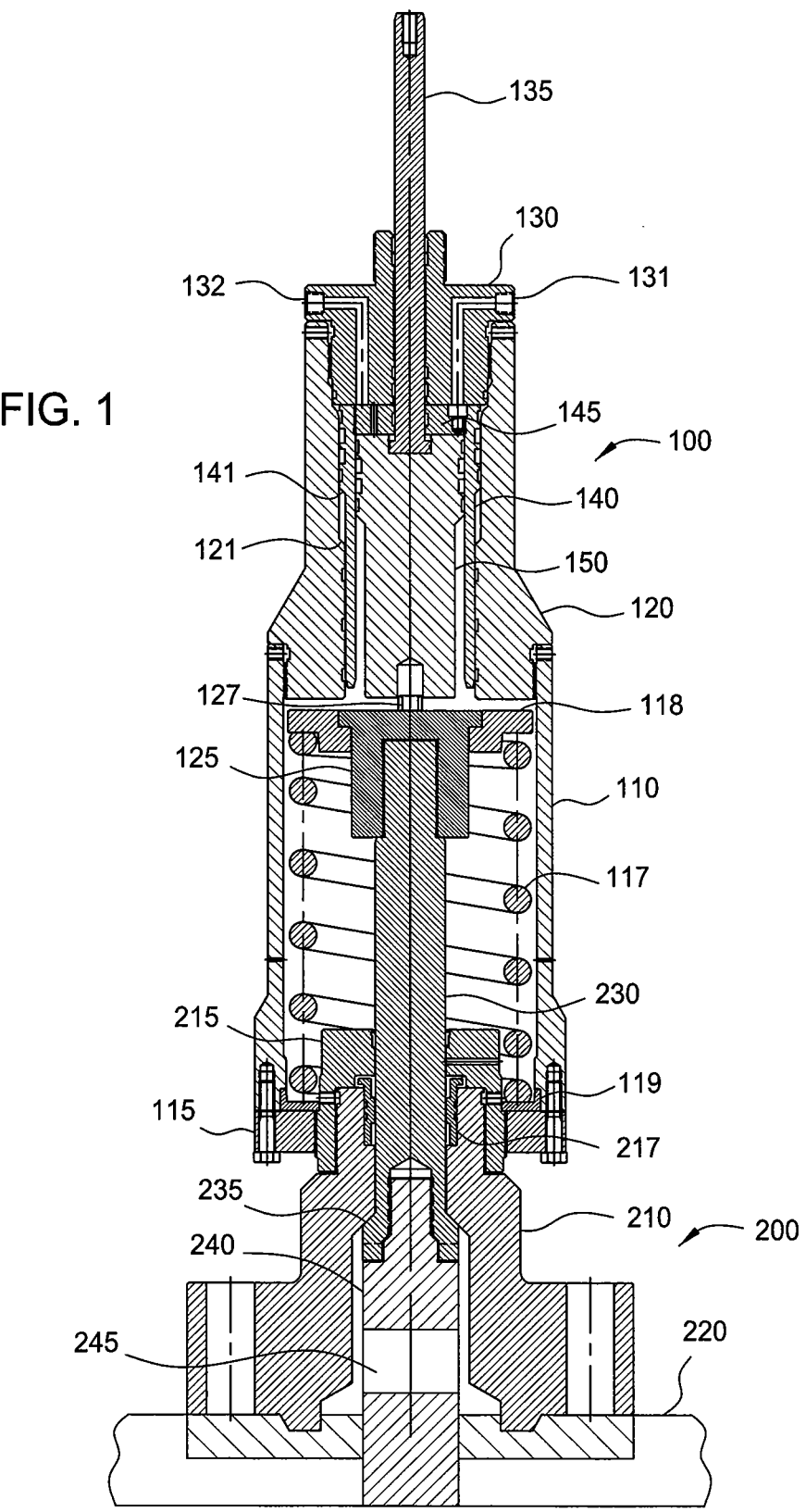
FIG. 1 is a sectional view of an actuator and a gate valve in a closed position according to one embodiment.

FIG. 1 is a sectional view of an actuator 100 coupled to a gate valve 200. The gate valve 200 is illustrated in a closed position, such that fluid flow through the gate valve 200 is blocked. Although described herein with respect to the operation of the gate valve 200, the actuator 100 may be used with other types of valves and/or actuator-powered systems.

The actuator 100 may be coupled to a bonnet assembly of the gate valve 200, the bonnet assembly comprising a bonnet housing 210, a bonnet cap 215, and a seal/bearing/wiper sleeve 217. The bonnet cap 215 may be threadedly coupled to the outer diameter, upper end portion of the bonnet housing 210. One or more set screws may be disposed through the bonnet cap 215 and into engagement with the bonnet housing 210 to prevent uncoupling. The sleeve 217 may be enclosed within an upper bore of the bonnet housing 210 by the bonnet cap 215. One or more seals, such as o-rings, may be provided between the sleeve 217 and the inner diameter of the bonnet housing 210.

A valve stem 230 is movably disposed through the bonnet assembly and includes a shoulder 235 for engagement with an inner shoulder of the bonnet housing 210 to prevent removal of the valve stem 230, to provide a sealing interface, and/or to stop the travel of the valve gate 240 when in the closed position. The bonnet assembly is coupled to a valve body 220, such as by a thread, a weld, and/or a bolt/screw connection. A valve gate 240 is coupled to the valve stem 230 for axial movement within the valve body 220 to open and close fluid flow through the valve body 220 via an opening 245 of the valve gate 240.

A housing of the actuator 100 comprises a bottom plate 115, a spring housing 110, a piston housing 120, and a top cap 130. The bottom plate 115 may be coupled to the bonnet cap 215 by a thread, a weld, and/or a bolt/screw connection. The actuator 100 housing components may similarly be coupled to each other. The bottom plate 115 may be connected to the bottom end of the spring housing 110, the piston housing 120 may be connected to the upper end of the spring housing 110, and the top cap 130 may be connected to the upper end of the piston housing 120. In one embodiment, the actuator 100 housing components may be threadedly coupled together with set screws engagements to prevent uncoupling. In one embodiment, one or more of the actuator 100 housing components may be formed integrally and/or from multiple pieces.

Within the spring housing 110 is a spring 117 (other similar biasing members may be used) disposed between an upper retaining plate 118 and a lower retaining plate 119. The lower retaining plate 119 may be coupled to the bottom plate 115 and disposed around the bonnet cap 215. The upper retaining plate 118 is coupled to a retaining nut 125, which may be threadedly connected to the upper end of the valve stem 230. An inner shoulder of the upper retaining plate 118 may be biased into engagement with an outer shoulder of the retaining nut 125 by the spring 117 to secure the components together. The upper retaining plate 118 may be rotatable relative to the retaining nut 125 to compensate for any transverse forces provided by the spring 117 during compression as described herein. The spring 117 also biases the valve stem 230 (via the upper retaining plate 118 and the retaining nut 125) in an upward direction and/or away from the valve body 220 until the shoulder 235 of the valve stem 230 engages the bonnet housing 210. The valve gate 240 is thereby moved into the closed position as illustrated in FIG. 1.

Within the piston housing 120 is a first piston 140, a second piston 150, and a plate member 145. The second piston 150 may be concentrically disposed within and movable relative to the first piston 140. The plate member 145 is coupled to the upper end of the first piston 140 (such as by a threaded connection) and includes a bore through which a top shaft 135 is disposed for connection to the upper end of the second piston 150. The remaining portion of the top shaft 135 is disposed through the bore of the top cap 130 and out of the upper end of the actuator 100 housing, visible by an operator or other users. The top cap 135 includes an inlet 131 and an outlet 132 for supplying and/or returning pressurized fluid to and from the actuator 100 to actuate the first and second pistons 140, 150. One or more seals, such as o-rings, may be provided between the outer diameter of the first piston 140 and the inner diameter of the piston housing 120. One or more seals, such as o-rings, may also be provided between the outer diameter of the second piston 150 and the inner diameter of the first piston 140. One or more seals, such as o-rings, may further be provided between the top cap 130 and the piston housing 120 interfaces, as well as the top cap 130 and the top shaft 135 interfaces.

To actuate the gate valve 200 into the open position, pressurized fluid may be supplied through inlet 131 to a first (sealed) chamber 160 formed by the top cap 130, the piston housing 120, the first piston 140, and the plate member 145. Pressurized fluid in the first chamber 160 acts on a first piston area defined by the upper surfaces of the first piston 140 and the plate member 145 to overcome the force of the spring 117 and any other forces such as static gate sealing forces, initial drag forces, and/or pressure forces within the valve body 220 acting against the valve stem 230 and/or the gate 240. The pressurized fluid acting on the first piston area provides an initial thrust force that moves the first piston 140 and the plate member 145 into contact with an upper surface of the second piston 150 (if not already contacting). The initial thrust force moves the first piston 140, the plate member 145, and the second piston 150 relative to the actuator 100 housing and into engagement with the retaining nut 125. A guide member 127 may be provided for directing the second piston 150 into contact with the upper end of the retaining nut 125. Upon contact, the initial thrust force continues to move the second piston 150 and the retaining nut 125 against at least the spring 117 force, to thereby move the valve stem 230 and the valve gate 240 axially within the valve body 220.

The initial thrust force may be required to initiate movement of the valve gate 240 and overcome the combination of the spring 117 force, static gate sealing forces, initial drag forces, and/or pressure forces within the valve body 220 acting against the valve stem 230 and/or the valve gate 240. However, after the initial stroke of the valve gate 240, the subsequent thrust force required to move the gate valve 240 through the complete valve stroke to the open position may only need to overcome at least the force of the spring 117, and possibly pressure forces within the valve body 220. The actuator 100 is therefore operable to provide a greater, initial thrust force for a pre-determined distance and/or amount of valve stroke, and a lesser, subsequent thrust force for another pre-determined distance and/or the remainder of the valve stroke.

Figure 2:
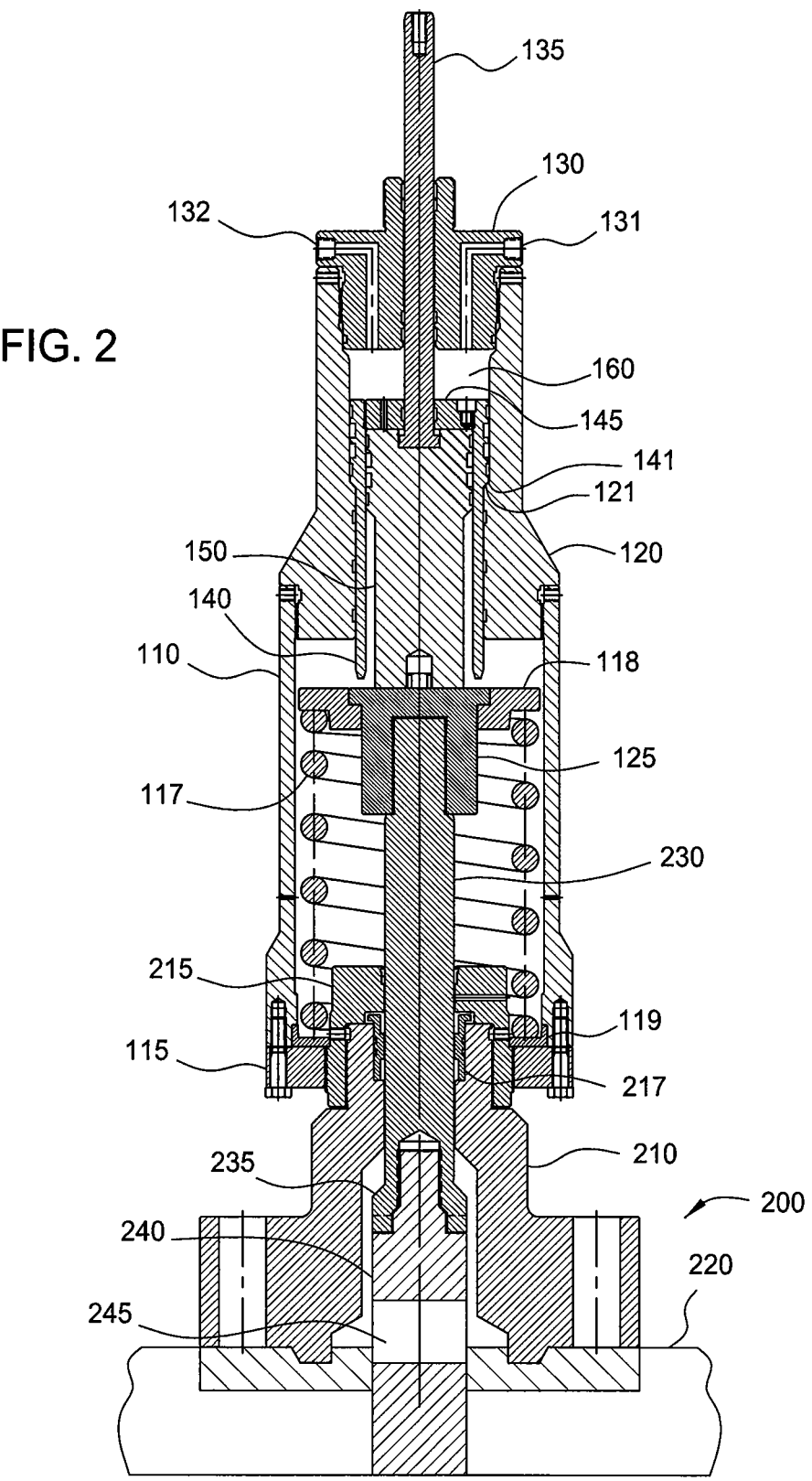
FIG. 2 is a sectional view of the actuator and the gate valve in a partially open position according to one embodiment.

As illustrated in FIG. 2, the initial thrust force (provided by the pressurized fluid in the first chamber 160 acting on the first piston area defined by the upper surfaces of the first piston 140 and the plate member 145) moves the first and second pistons 140, 150 together in a first, downward direction and/or toward the valve body 220. The first and second pistons 140, 150 move together until an outer shoulder 141 of the first piston 140 contacts an inner shoulder 121 (or other stop-type member) of the piston housing 120. The shoulder engagement prohibits further movement of the first piston 140 and the plate member 145 in the first direction beyond the pre-determined distance and/or initial stroke. The second piston 150, however, may continue to move in the first direction beyond the pre-determined distance as described with respect to FIG. 3.

Figure 3:
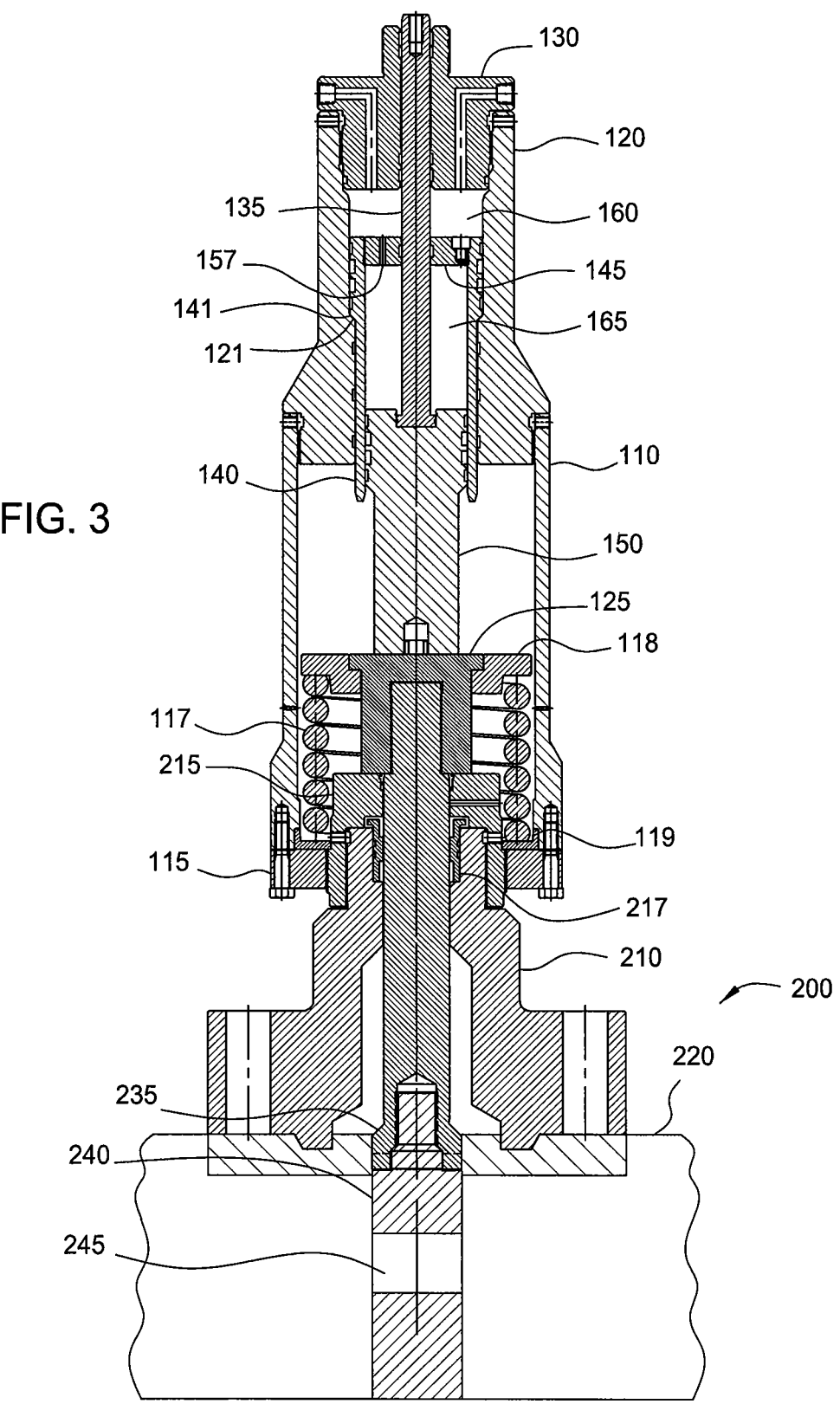
FIG. 3 is a sectional view of the actuator and the gate valve in an open position according to one embodiment.

As illustrated in FIG. 3, pressurized fluid supplied to the first chamber 160 is also communicated to a second (sealed) chamber 165 via one or more ports 157 disposed through the plate member 145. The second chamber 165 is formed by the first piston 140 bore, the plate member 145, and the second piston 150. Pressurized fluid in the second chamber 165 acts on a second piston area defined by the upper surface of the second piston 150 and/or any corresponding planar portion of the top shaft 135, which provides a subsequent, lesser thrust force to move the valve stem 230 and the valve gate 240 through the remaining stroke to the open position. The second piston 150 moves the retaining nut 125 (thereby further compressing the spring 117 via the upper retaining plate 118), the valve stem 230, and the valve gate 240 through the remaining valve stroke until the valve 200 is in the open position (e.g. when the opening 245 of the valve gate 240 is in alignment with a bore of the valve body 220 to allow unobstructed fluid flow through the valve body 220) and/or when the bottom end of the retaining nut 125 engages the upper end of the bonnet cap 215. The top shaft 135 is also moved through the top cap 130 and the plate member 145 by its connection to the second piston 150. As the gate valve 200 is actuated to the open position, the portion of the top shaft 135 that extends from the upper end of the actuator 100 housing is reduced and moves into the housing to provide a visual indication to an operator or other user of the operational position of the actuator 100 and/or the gate valve 200. The top shaft 135 may provide an indication that the actuator 100 and/or gate valve 200 are in the closed position when the top shaft 135 is fully extended from the actuator 100 housing. The top shaft 135 may provide an indication that the actuator 100 and/or gate valve 200 are in the open position when the top shaft 135 is almost fully inserted into actuator 100 housing.

In one embodiment, the first piston area defined by the upper surfaces of the first piston 140 and/or the plate member 145 is greater than the second piston area defined by the upper surfaces of the second piston 150 and/or any corresponding planar portion of the top shaft 135. In one embodiment, the one or more components defining the first piston area may be integral with each other to provide a single continuous first piston area surface. In one embodiment, the one or more components defining the second piston area may be integral with each other to provide a single continuous second piston area surface. In one embodiment, the initial thrust force provided by pressurized fluid in the first chamber 160 acting on the first piston area is greater than the subsequent thrust force provided by pressurized fluid in the second chamber 165 acting on the second piston area. The first and/or second piston areas may be dimensioned to provide the necessary thrust forces during the initial and subsequent strokes of the actuator 100 and/or gate valve 200.

In one embodiment, the volume of fluid required to actuate the gate valve 200 using the actuator 100 is significantly reduced by the reduction in volume from the transition of the first chamber 160 to the second chamber 165, as compared to using the first piston 140 only to stroke the gate valve 200 the entire distance from the closed position to the open position. In one example, the swept volume, e.g. the volume of fluid required to actuate a similar size but single-piston actuator through full stroke, may be reduced up to about 50 percent or more using the actuator 100. In one example, a conventional single piston actuator for operating a 7-8 inch, 10-15 kpsi valve may have a swept volume of about 4-3.5 liters, whereas the actuator 100 may be configured with a swept volume of less than about 2-2.5 liters for operating the same valve. The sizes and dimensions (e.g. inner and/or outer diameter, length, wall thickness, etc.) of the actuator 100 housing, the first piston 140, the second piston 150, and/or the plate member 145 may be configured to provide the thrust forces and/or swept volumes for operating various types and sizes of valves.

To move the gate valve 200 to the closed position, the pressurized fluid in the chambers 160, 165 may be removed through the outlet 132 until at least the spring 117 force is sufficient to overcome any thrust force provided by the first and/or second pistons 140, 150. The spring 117 force moves the valve stem 230 (via the upper retaining plate 118 and the retaining nut 125) and the valve gate 240 in an opposite, upward direction and/or toward the top cap 130. The spring 117 force may also move the first and/or second pistons 140, 150 (via the retaining nut 125) in the opposite, upward direction and/or toward the top cap 130, thereby collapsing the chambers 160, 165. The shoulder 235 on the valve stem 230 may engage the inner shoulder on the bonnet housing 210 to limit or stop the movement by the spring 117 force. At this point, the gate valve 240 may be in the closed position as illustrated in FIG. 1. The operation of the actuator 100 and/or the gate valve 200 may be repeated as desired.

While the foregoing is directed to embodiments of the invention, other and further embodiments of the invention may be devised without departing from the basic scope thereof, and the scope thereof is determined by the claims that follow.

The invention claimed is:

1. A gate valve actuator, comprising:
    a housing;
    a first piston movably disposed in the housing, wherein the first piston comprises an outer shoulder formed on an outer diameter of the first piston that is configured to engage an inner shoulder formed on an inner diameter of the housing to limit movement of the first piston in a first direction;
    a second piston movably disposed in a bore of the first piston, wherein the second piston is movable in the first direction after engagement between with the outer shoulder of the first piston and the inner shoulder of the housing;
    a biasing member disposed in the housing and configured to bias the first and second pistons in a second direction that is opposite the first direction;
    a retaining plate disposed in the housing and configured to retain one end of the biasing member; and
    a retaining nut disposed in the housing and coupled to the retaining plate, wherein the second piston is moveable into engagement with the retaining nut to compress the biasing member via the retaining plate.

2. The actuator of claim 1, wherein the second piston is concentrically disposed within the bore of the first piston.

3. The actuator of claim 1, further comprising a plate member coupled to the first piston for contacting an upper surface of the second piston.

4. The actuator of claim 3, wherein the plate member is operable to transfer a thrust force to the second piston when moving in the first direction.

5. The actuator of claim 3, wherein the plate member is operable to transfer a spring force to the first piston when moving in a direction opposite the first direction.

6. The actuator of claim 3, further comprising a shaft coupled to the second piston and movably disposed through the plate member.

7. The actuator of claim 1, further comprising a shaft coupled to the second piston and extending out of the housing for providing a visual indication of the operational position of the actuator.

8. The actuator of claim 1, further comprising a first chamber formed by the housing and an upper surface of the first piston, and a second chamber formed by the bore of the first piston and an upper surface of the second piston.

9. The actuator of claim 8, wherein the first chamber is in fluid communication with the second chamber.

10. The actuator of claim 1, wherein the first piston defines at least a portion of a first piston area, wherein the second piston defines at least a portion of a second piston area, and wherein the first piston area is greater than the second piston area.

11. A method of operating a gate valve actuator, comprising:
    supplying pressurized fluid to a first chamber of an actuator housing, thereby moving a first piston and a second piston in a first direction a first pre-determined distance, wherein the second piston is movably disposed within a bore of the first piston;
    prohibiting movement of the first piston in the first direction beyond the first pre-determined distance when an outer shoulder formed on an outer diameter of the first piston engages an inner shoulder formed on an inner diameter of the actuator housing;

supplying pressurized fluid to a second chamber of the actuator housing to move the second piston in the first direction a second pre-determined distance, wherein a retaining plate disposed in the actuator housing retains one end of a biasing member within the actuator housing, and wherein a retaining nut disposed in the actuator housing is coupled to the retaining plate;

moving the second piston in the first direction the second pre-determined distance and into engagement with the retaining nut to thereby compress the biasing member using the retaining plate; and biasing the first and second pistons in a second direction that is opposite the first direction using the biasing member disposed in the actuator housing.

12. The method of claim 11, further comprising providing an initial thrust force using the first piston, and providing a subsequent thrust force using the second piston, wherein the initial thrust force is greater than the subsequent thrust force.

13. The method of claim 11, wherein the second piston sealingly engages an inner diameter of the first piston.

14. The method of claim 11, further comprising simultaneously moving the first piston and the second piston in the first direction the first pre-determined distance.

15. The method of claim 11, wherein the first and second chambers are in fluid communication such that pressurized fluid is supplied to the second chamber through the first chamber.

16. The method of claim 11, wherein the second pre-determined distance is greater than the first pre-determined distance.

17. The actuator of claim 1, wherein the second piston is movable a pre-determined distance that is greater than a pre-determined distance that the first piston is movable.

18. The actuator of claim 1, wherein the second piston sealingly engages an inner diameter of the first piston.

* * * * *